United States Patent
Hazumi et al.

(10) Patent No.: US 6,339,395 B1
(45) Date of Patent: Jan. 15, 2002

(54) RADAR APPARATUS USING DIGITAL BEAM FORMING TECHNIQUES

(75) Inventors: Hiroshi Hazumi, Nagoya; Kazuma Natsume, Kariya, both of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/538,499

(22) Filed: Mar. 30, 2000

(30) Foreign Application Priority Data

Mar. 31, 1999 (JP) .......................................... 11-092543

(51) Int. Cl.⁷ .............................................. G01S 13/34
(52) U.S. Cl. ...................................................... 342/196
(58) Field of Search ................................. 342/195, 196, 342/89; 367/103

(56) References Cited

U.S. PATENT DOCUMENTS

| | | | |
|---|---|---|---|
| 5,369,409 A | | 11/1994 | Urabe et al. |
| 5,757,307 A | * | 5/1998 | Nakatani et al. ............ 342/196 |
| 6,121,917 A | * | 9/2000 | Yamada ....................... 342/196 |
| 6,426,365 | * | 6/2001 | Tokoro ........................ 342/196 |

FOREIGN PATENT DOCUMENTS

| | | |
|---|---|---|
| JP | 5-40168 | 2/1993 |
| JP | 5-150037 | 6/1993 |
| JP | 6-317653 | 11/1994 |
| JP | 7-5252 | 1/1995 |
| JP | 8-271614 | 10/1996 |
| JP | 10-63645 | 3/1998 |

OTHER PUBLICATIONS

"DBF RADER" edited by K. Yoshida; Revised Radar Technology: Oct. 1, 1996; pp. 289–291 (W/partial English translation).

* cited by examiner

*Primary Examiner*—Ian J. Lobo
(74) *Attorney, Agent, or Firm*—Law Office of David G. Posz

(57) ABSTRACT

A radar apparatus is provided which is designed to form digital beams using beat signals each of which is produced by one of a plurality of receivers and analyze the frequency of the beat signals in units of the beams for obtaining data such as the distance to, relative speed, and azimuth of a target. The apparatus performs the complex Fourier Transform twice on beat signals in time series and space series along the array of receiving antennas to derive results of the frequency analysis in units of the beams, thereby resulting in simplified structure and decrease in operation load of the apparatus.

6 Claims, 8 Drawing Sheets

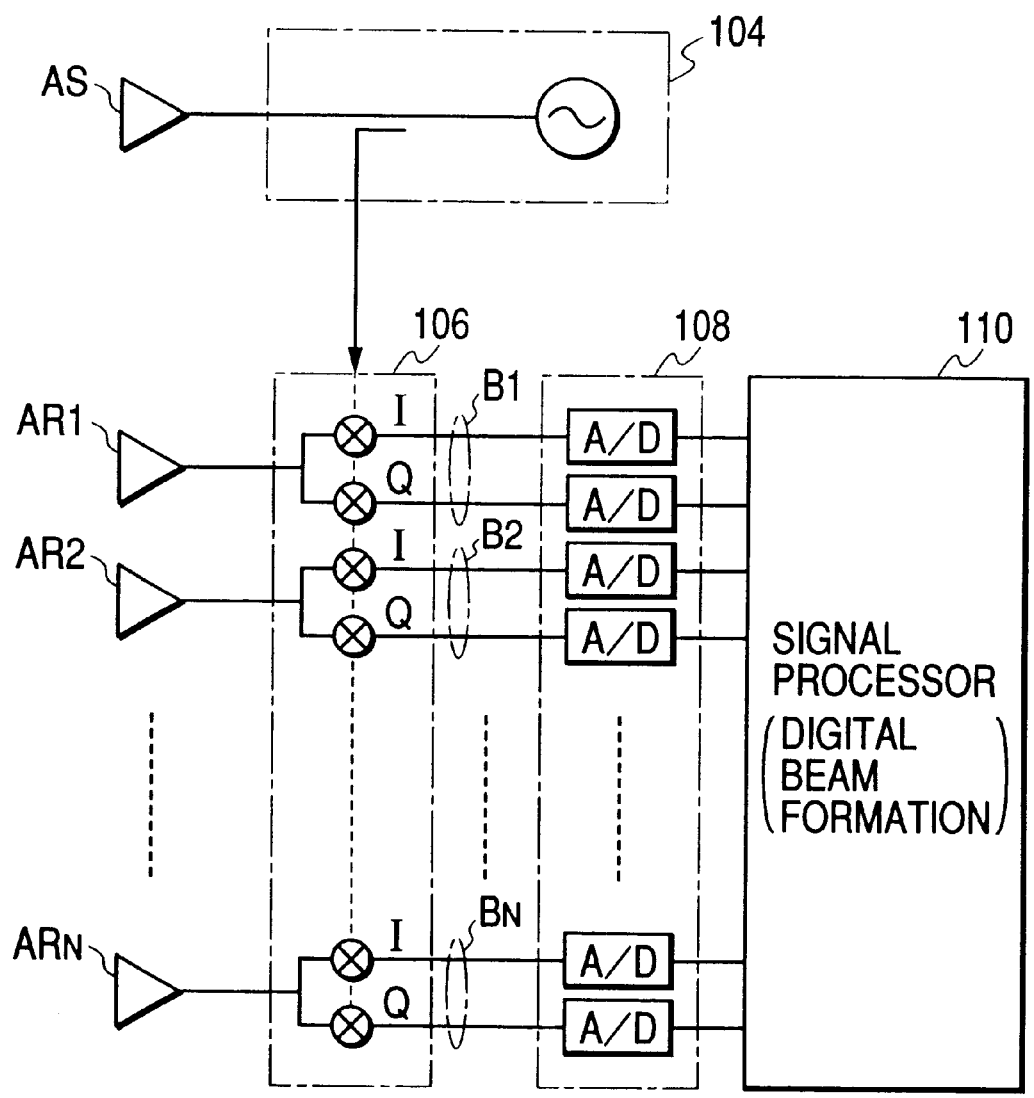

RADAR APPARATUS USING DIGITAL BEAM FORMING TECHNIQUES

BACKGROUND OF THE INVENTION

1. Technical Field of the Invention

The present invention relates generally to a radar apparatus designed to transmit a continuous wave for detecting a target object, and more particularly, to a radar apparatus designed to process beat signals to form digital beams using the complex Fast Fourier Transform (FFT) for frequency analysis of the beat signals.

2. Background Art

Automotive radar systems are known which are designed to measure the distance to, the azimuth, and the relative speed of an object present ahead of an automotive vehicle for cruise control and/or anti-collision control. Radar systems of this type usually use as a radar wave a continuous wave (CW) or a frequency-modulated continuous wave (FM-CW). The radar systems receive a return of the radar wave from an object, mix it with a local signal having the same frequency as that of the transmit signal (i.e., the transmitted radar wave) to produce a beat signal whose frequency is equivalent to a difference in frequency between the received signal and the local signal, and analyze the frequency of the beat signal to derive information on the target object.

Specifically, the return of the radar wave undergoes the Doppler shift as a function of the speed of the radar system relative to the target object. The travel of the radar wave to and from the target object causes the received signal to be changed in frequency and phase from the transmit signal. This change appears at the beat signal. The distance to and relative speed of the target object may, thus, be determined by analyzing the beat signal.

The detectable range of the radar system is defined geometrically by a beam emitted from or received by an antenna. It is, thus, advisable that multiple beams be provided in order to increase the detectable range without decreasing the detectable distance to a target or determine the azimuth of the target in the limited detectable range. The provision of the multiple beams is typically achieved using a plurality of antennas oriented in different directions or a known phased array, but in recent years when it has become possible to process digital signals at high speeds, attention is being paid to digital beam forming (DBF) which forms a plurality of beams through digital signal processing.

FIG. 8 shows one example of conventional radar systems adapted to produce beams using the DBF technique.

A transmitting antenna AS installed in a transmitter 104 radiates a radar wave. A return of the radar wave from an object is received by a plurality of receiving antennas AR1 to ARN simultaneously. A receiver 106 mixes a signal outputted from each receiving antenna ARi (i=1, 2, ..., N) with a local signal whose frequency is equal to that of the radiated radar wave to produce a beat signal. The beat signals thus produced are inputted to a signal processor 110 through an A/D converter circuit 108. The signal processor 110 performs a phase/weighting operation on the beat signals in a digital form for producing beams. Specifically, the signal processor 110 realizes functions of analog phase shifters installed in each radiating element in a conventional phased array system and of combining outputs of the analog phase shifters in an analog form.

Usually, the DBF requires expression of the beat signals B1 to BN produced by signals received by the receiving antennas AR1 to ARN in baseband complex signal each made of a real signal I and an imaginary signal Q. The receiver 106 and the A/D converter circuit 108, thus, require not only dual channels each made of a mixer and an A/D converter for each receiving antenna, but also increasing of power of the local signals L supplied to the mixers, which will result in an increase in circuit size.

The reason why the DBF requires the baseband complex signals is because it is difficult to specify the phase of a baseband scalar signal derived only by a received signal in one channel at any time, thus resulting in a difficulty in determining the direction of incoming of a return of the radar wave based on results of operations performed in the DBF.

FIG. 6(a) illustrates signals received by antennas each expressed in a baseband complex signal made up of a real signal I and an imaginary signal Q and corresponding baseband scalar signals each expressed in vector in a first case where a radar return enters a plane of an array of antennas at an angle of a° to a line perpendicular to the plane from a right direction, as viewed in the drawing. FIG. 6(b) illustrates for a second case where a radar return enters the antenna-arrayed plane at an angle of −a° to the line perpendicular to the plane from a left direction, as viewed in the drawing. As clearly shown in the drawings, each baseband complex signal in the first case has a sign reverse to that of a corresponding one of the baseband complex signals in the second case, thereby enabling the radar returns to be discriminated between the first and second cases. It is, however, impossible to use the baseband scalar signals each made up of only the real signal I to discriminate the radar returns between the first and second cases.

In other words, the vector of each baseband scalar signal becomes, as shown in FIG. 7, equivalent to that of a corresponding one of the baseband complex signal in a case where radar returns having the same level enter the antenna-arrayed plane from two directions of ±a°. Therefore, if the complex Fourier transform is performed on the baseband scalar signals in the direction of a spatial axis to form the beams, it may cause peaks to appear on resultant frequency components in the both directions of ±a°, which leads to a difficulty in determining whether the baseband scalar signals are produced by the radar return traveling from the direction of +a° or −a° or to an erroneous decision that two signals traveling from the both directions of ±a° have entered the antennas simultaneously.

There has been also proposed a technique for digitizing received signals using high frequency A/D converters before the beat signals undergo a frequency conversion and realizing a two-channel mixer function in a computer through digital signal processing. For example, Japanese Patent First Publication No. 10-63645 teaches such a technique. This, however, requires a large number of expensive A/D converters, thus resulting in an increase in total production cost of the system.

Further, precise measurement of the azimuth or angular direction of a target object within a limited angular range generally requires use of a large number of antennas (i.e., received signals). This also requires many receivers, thus resulting in an increased size of the system.

SUMMARY OF THE INVENTION

It is therefore a principal object of the present invention to avoid the disadvantages of the prior art.

It is another object of the present invention to provide a radar system having a simple structure which is smaller in load on operations to form digital beams and analyze the frequency of each digital beam.

It is a further object of the invention to provide a radar system which has a compact structure capable of measuring the azimuth of a target with high accuracy.

According to one aspect of the invention, there is provided a radar apparatus which comprises: (a) a transmitter providing a transmit signal having a preselected frequency to produce an output signal to be transmitted as a radar wave to a radar detectable zone; (b) an array of receiving antennas; (c) a plurality of receivers each of which mixes an input signal that is a return of the radar wave from a target object received by one of the receiving antennas with a local signal having the same frequency as that of the transmit signal to produce a single beat signal including a frequency component corresponding to a difference in frequency between the output signal and the input signal; and (d) a signal processing circuit forming beams made of components of the beat signals corresponding to angular directions predetermined in the radar detectable zone, the signal processing performing complex Fourier Transform twice on the beat signals in time series and space series along the array of the receiving antennas to derive results of frequency analysis in units of the beams.

In the preferred mode of the invention, the signal processing circuit adds a plurality of dummy data whose values are zero to the beat signals when the Fourier Transform is performed in the space series so as to produce frequency components greater in number than the receivers.

Each of the receivers receives the input signal from one of the receiving antennas arrayed in line. The signal processing circuit performs the complex Fourier Transform on each of a first beat signal group made up of the beat signals produced by the input signals from the antennas other than one located at one end of the array of the antennas and a second beat signal group made up of the beat signals produced by the input signals from the antennas other than one located at the other end of the array of the antennas to form the beams in units of the first and second beat signal groups.

The signal processing circuit performs the complex Fourier Transform, in the time series, on the beat signal produced by each of the receivers to produce frequency components and also performs the complex Fourier Transform, in the space series, on the frequency components produced using the beat signals in all the receivers in units of frequency for forming the beams.

The transmitter produces the transmit signal whose frequency is increased and decreased cyclically.

The transmitter produces, in sequence, a plurality of transmit signals having different frequencies.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings:

FIG. 8 is a conventional radar apparatus designed to form digital beams.

DESCRIPTION OF THE PREFERRED EMBODIMENTS

Figure 1:
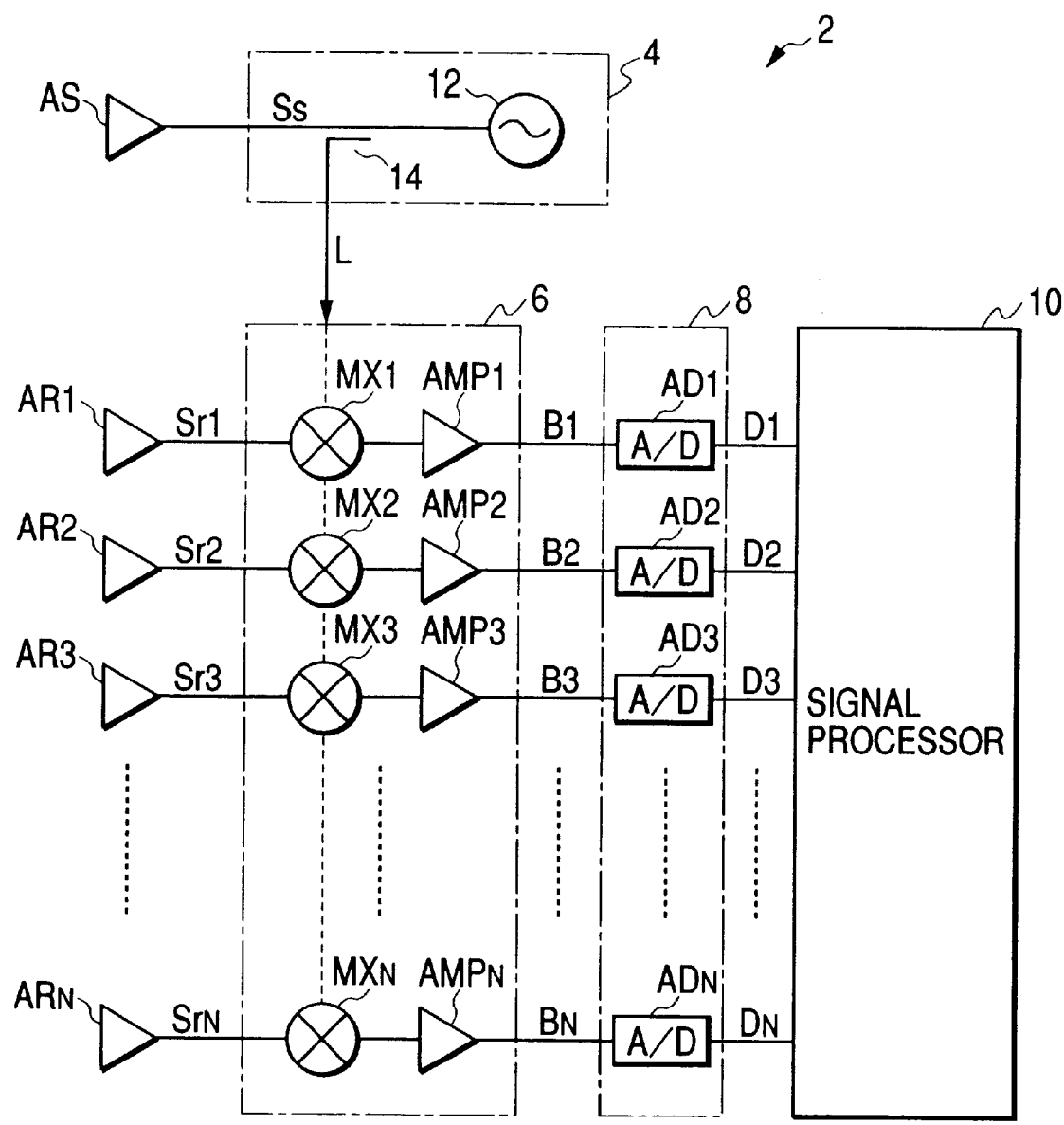
FIG. 1 is a block diagram which shows a radar apparatus according to the invention.

Referring now to the drawings, wherein like numbers refer to like parts in several views, particularly to FIG. 1, there is shown a radar apparatus 2 according to the first embodiment of the invention which may be employed in automotive anti-collision systems or automotive radar cruise control systems to detect the presence of obstacles in front of a radar-mounted vehicle.

The radar apparatus 2 generally includes a transmitter 4, an N-channel receiver 6 (N=8 in this embodiment), an A/D converter circuit 8, and a signal processor 10.

The transmitter 4 transmits a radar wave in the form of a millimeter wave through a transmitting antenna AS. A return of the radar wave (also referred to as a reflected wave below) from a target object such as a preceding vehicle or a roadside obstacle is received by a plurality of receiving antennas AR1 to ARN (N=8 in this embodiment) arrayed in line at regular intervals. The receiver 6 receives outputs from the antennas AR1 to ARN to produce N beat signals B1 to BN, as will be described later in detail. The A/D converter circuit 8 consists of N A/D converters AD1 to AND which sample the beat signals B1 to BN from the receiver 6 cyclically to produce digital signals D1 to DN (referred to as digital beat signals below), respectively. The signal processor 10 performs given operations, as will be discussed later in detail, on each of the digital beat signals D1 to DN inputted from the A/D converter circuit 8.

The transmitting antenna AS is so designed as to emit a radar beam whose beam width covers the whole of a desired radar detectable zone. Each receiving antenna ARi (i=1, 2, . . . , N) is designed so as to have the beam width (i.e., sensitive angular width) which covers the beam width of the transmitting antenna AS.

The transmitter 4 consists of a high frequency oscillator 12 and a distributor 14. The high frequency oscillator 12 produces a high frequency signal in a millimeter wave band which is so modulated as to vary with time in a linear fashion like a triangular wave. The distributor 14 splits in power the high frequency signal produced by the high frequency oscillator 12 into a transmit signal Ss and a local signal L. The transmit signal Ss is radiated from the transmitting antenna As as a radar wave. The local signal L is supplied to the receiver 6.

The receiver 6 has N channels each consisting of a high frequency mixer MXi (i=1, 2, . . . , N) and an amplifier AMPi (i=1, 2, . . . , N). Each high frequency mixer MXi mixes the local signal L with a corresponding one of input signals Sr1 to SrN received by the antennas AR1 to ARN to produce the beat signal Bi. Each amplifier AMPi amplifies the beat signal Bi and performs a filter function to remove unwanted high frequency components from the beat signal Bi.

In the following discussion, each series of the mixer MXi, the amplifier AMPi, and the A/D converter ADi which handles the input signal Sri received by one of the antennas AR1 to ARN to produce the digital beat signals Di will be referred to as a receiver channel chi.

When the radar wave is transmitted in the form of a frequency-modulated continuous wave (FM-CW) from the antenna AS of the transmitter 4, and the antennas AR1 to ARN of the receiver 6 each receive a return of the radar wave, each receiver channel chi mixes through the mixer AMi the input signal Sri produced by the antenna ARi with the local signal L supplied from the transmitter 4 to produce the beat signal Bi made of a frequency component equivalent to a difference in frequency between the input signal Sri and the local signal L, amplifies and removes unwanted high frequency components from the beat signal Bi through the amplifier AMPi, and converts the beat signal Bi through the A/D converter ADi into the digital beat signals Di. Each A/D converter ADi is designed to sample the beat signal Bi M times (M=512 in this embodiment) every half a cycle of periodic changes in frequency of the transmit signal Ss, that is, each time the frequency of the transmit signal Si is modulated so as to increase or decrease linearly. In the following discussion, a period of time during which the frequency of the transmit signal Ss is modulated so as to increase in a linear fashion will be referred to as a modulated-frequency rising range, while in a period of time during which the frequency of the transmit signal Ss is modulated so as to decrease in the linear fashion will be referred to as a modulated-frequency falling range.

The signal processor 10 includes a microcomputer made up of a CPU, a ROM, and a RAM, an input port into which data is inputted from the A/D converter circuit 8, and a digital signal processor (DSP) performing a Fast Fourier Transform (FFT).

Figure 2:
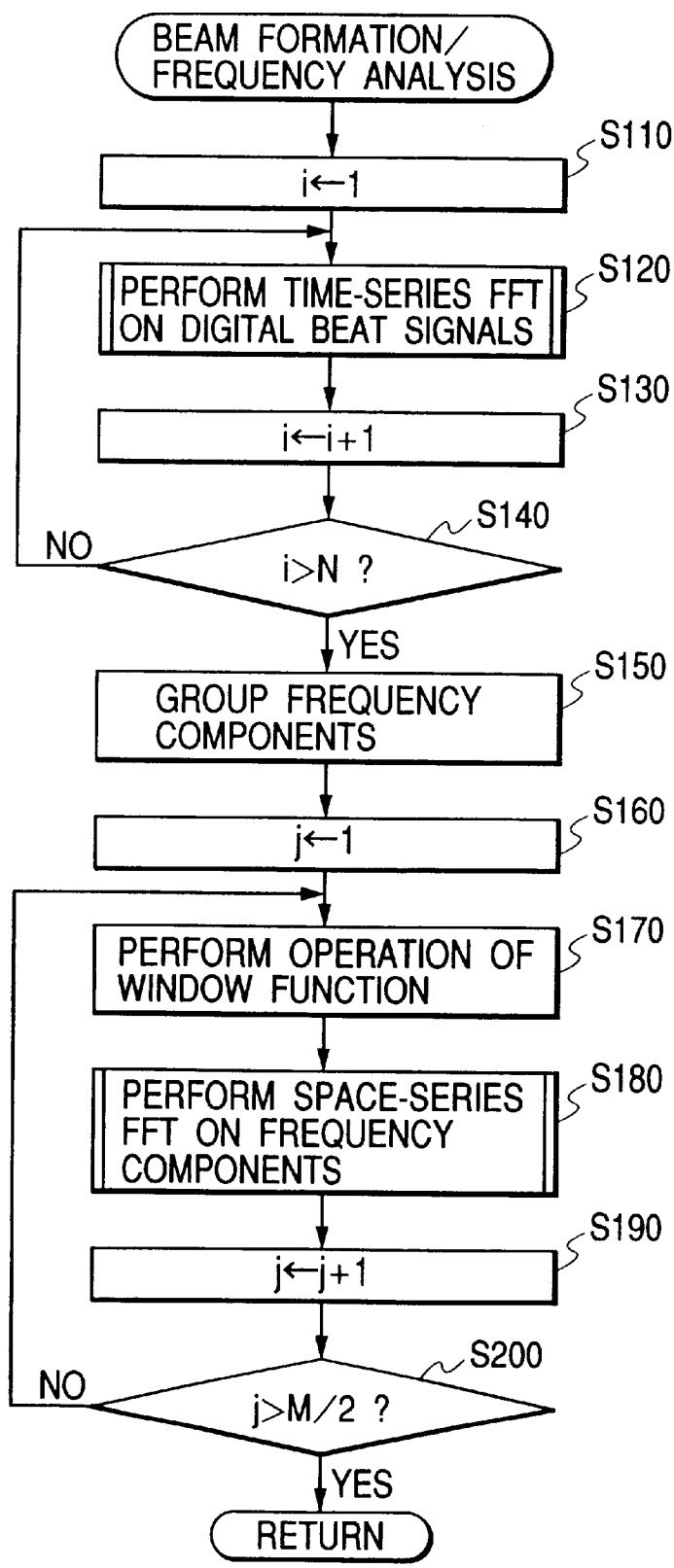
FIG. 2 is a flowchart of a beam formation/frequency analysis program according to the first embodiment of the invention.

FIG. 2 is a flowchart of a program performed by the signal processor 10 to form digital beams using the digital beat signals Di and to analyze the frequency of the digital beat signals Di in units of the digital beams. This program is executed each time the A/D converter circuit 8 samples the beat signal Bi cyclically for one cycle of frequency changes in the transmit signal Ss, and the M digital beat signal Di (D[i, 1], . . . , D[I, M], "i" indicates the number of the receiver channel CHi) are sampled in each of the frequency-modulated rising and falling ranges and stored in a memory of the signal processor 10.

After entering the program, the routine proceeds to step 110 wherein an ID number i for identifying one of the receiver channels ch1 to chi is initialized to one (1). The routine proceeds to step 120 wherein a M-point complex FFT operation is performed, in time sequence, on the digital beat signals Di of a first one of the receiver channels chi (i.e., the receiver channel chi), which will be referred to as a time-series FFT operation below. Note that each of the digital beat signals Di is a scalar signal which is expressed by a single value (a real value) and handled on condition that an imaginary number thereof is zero (0).

By the time-series FFT operation, M data F[i, 1], . . . , F[i, M] are obtained which are each expressed in a complex number and correspond to different frequency components, respectively.

The routine proceeds to step 130 wherein the ID number i is incremented by one (1). The routine proceeds to step 140 wherein it is determined whether the ID number i is greater than the number N of all the receiver channels ch1 to chi or not. If a NO answer is obtained, the routine returns back to step 120 to perform the time-series FFT operation on the digital beat signals Di of the second receiver channel ch2.

If a YES answer is obtained meaning that the digital beat signals Di of all the receiver channels ch1 to chN have been processed, then the routine proceeds to step 150.

The time-series FFT operation produces frequency components having positive frequencies and frequency components having negative frequencies, but both carry the same information, and only M/2 data F[i, 1], . . . , F[i, M/2] which are made of the positive frequency components are used in subsequent operations.

In step 150, N×M/2 data F[i, j] (i=1, 2, . . . , N, and j=1, 2, . . . , M/2) which are the sum of the data derived in all the receiver channels chi are broken down according to frequencies Fj (j=1 to M/2) into M/2 frequency component groups: a group of frequency components F[1,1], . . . , F[N, 1], a group of frequency components F[1,2], . . . , F[N, 2], . . . , and a group of frequency components F[1,M/2], . . . , F[N, M/2].

The routine proceeds to step 160 wherein an ID number j for identifying one of the frequencies Fj (i.e., one of the M frequency component groups) is initialized to one (1). The routine proceeds to step 170 wherein an operation of a window function is performed on N data which belong to a first one of the frequency component groups (i.e., the frequency component group made up of the frequency components having the first frequency F1). The window function operation is used to regulate results of spatial frequency analysis when the complex FFT, as will be described later in detail, is performed in the order or direction of an array of the receiving antennas AR1 to ARN for shaping or decreasing side lobs of radar beams. The complex FFT performed in the direction of the array of the receiving antennas AR1 to ARN will be referred to as a space-series FFT below.

The routine proceeds to step 180 wherein to N data F[1, j], . . . , F[N, j] (j=1) which belong to the group of the first frequency F1 and have been subjected to the window function operation in step 170, P null dummy data F[N+1, j], . . . , F[N+P, j] (P=24 in this embodiment) are added to produce (N+P) data, and an (N+P)-point complex FFT is performed on the (N+P) data. The addition of the null dummy data may be made in a known manner called zero-padding.

By the space-series FFT, (N+M) beams are formed which are made up of data BM [1, j], . . . , BM[N+P, j], respectively, produced by separating the frequency components in one of the frequency component groups into (N+M) ones.

The routine proceeds to step 190 wherein the ID number j is incremented by one (1). The routine proceeds to step 200 wherein it is determined whether the ID number j is greater than the number M/2 of kinds of the frequency components to be processed or not. If a NO answer is obtained, the routine returns back to step 170 to perform the window function operation on N data which belong to the next group formed by the second frequency F2. Alternatively, if a YES answer is obtained, then the routine terminates.

Figure 3:
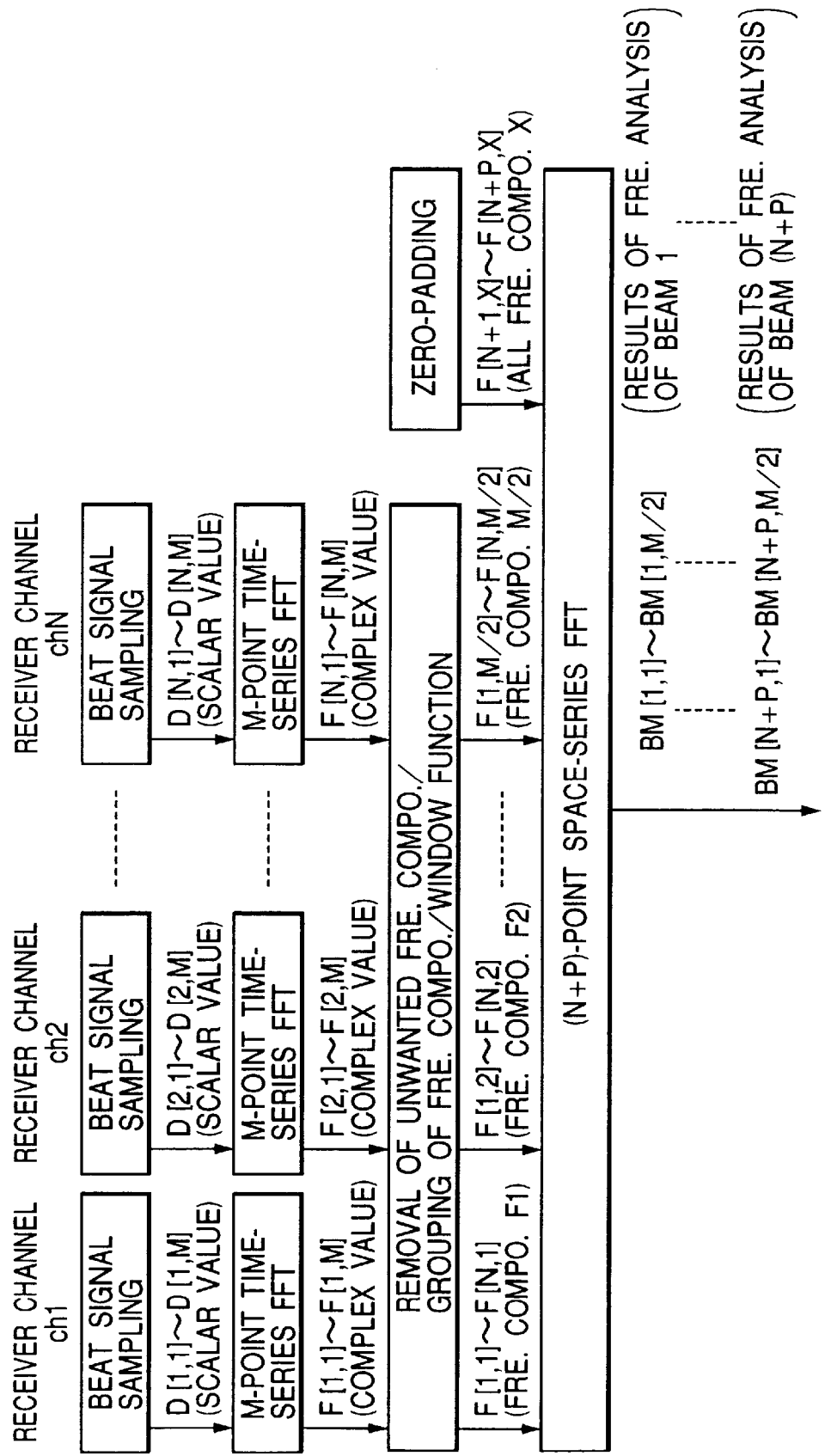
FIG. 3 is a block diagram which shows a sequence of operations performed in the flowchart of FIG. 2.

As apparent from the above discussion, each beat signal Bi is, as shown in FIG. 3, sampled to produce the M digital beat signals Di (D[i, 1], . . . , D[i, M] in each of the receiver channels ch1 to chN. The digital beat signals Di are processed to remove unwanted frequency components therefrom and grouped according to the frequencies Fj. The P dummy data F[N+1, j], . . . , F[N+P, j] are added to the frequency components F[1, j], . . . , F[N, j] in each group and then subjected to the (N+P)-point space-series FFT, thereby forming the (N+P) beams each corresponding to one of angular directions predetermined in the radar detectable zone each indicating the direction of incoming of a return of a radar beam emitted from the transmitter 4. Specifically, results of frequency analysis are obtained in units of the (N+P) beams, and M/2 data BM[ip, 1], ..., BM[ip, M/2] (ip=1, 2, ..., N+P) made of different frequency components to be derived in each of the receiver channels chi to chN.

The signal processor 10 finds the results of the frequency analysis in each of the frequency-modulated rising and falling ranges and uses beat frequencies produced by radar returns from the same object in the frequency-modulated rising and falling ranges to determine the distance to and relative speed of the target in a manner well known in the field of FMCW radar techniques. The signal processor 10 may also decide by which beam the target is detected to determine the azimuth or angular direction of the target.

The radar apparatus 2 of this embodiment is designed to perform the complex FFT twice in the time series and space series to obtain results of frequency analysis in unit of the digital beams, thereby allowing the baseband scalar signals to be used as the beat signals B1 to BN produced in the receiver 6. Further, each receiver channel chi is made up of a series of the mixer MXi, the amplifier AMPi, and the A/D converter ADi. This allows the structure of the radar apparatus 2 to be simplified greatly as compared with conventional radar systems such as the one shown in FIG. 8 which uses baseband complex signals as the beat signal.

The addition of the null dummy data to the data in each frequency group in the space-series FFT allows the number of the beams to be increased without increasing the number of receiver channels, which results in greatly improved accuracy in measuring the angular direction of the target.

The complex FFTs are performed in the order of the time series and the space series, thereby decreasing the amount of operation executed in the signal processor 10 greatly as compared with when the complex FFTs are performed in the reverse order. Specifically, a conventional system designed to perform the complex FFTs in the order of the space series and time series requires an operation on Eq. (1) below, while the radar apparatus of this embodiment requires an operation on Eq.(2) below.

$$M \times (N+P) \cdot \log(N+P) + (N+P) \times M \cdot \log(M) \quad (1)$$

$$N \times M \cdot \log(M) + M/2 \times (N+P) \cdot \log(N+P) \quad (2)$$

In this embodiment, M=512, N=8, and P=24. Thus, Eq.(1) ≈69050, and Eq.(2)≈23428. This means that an operation load of the radar apparatus 2 of this embodiment is one third of that of the conventional system. Specifically, it is possible for the radar apparatus 2 to perform the time axis FFT regardless of the dummy data added when the space-series FFT is performed and also to remove half of results of the operation of the time-series FFT when the space-series FFT is performed, thereby allowing the operation load to be reduced greatly.

The radar apparatus 2 according to the second embodiment will be described below which is different from the first embodiment in that the number of the receiving antennas AR1 to ARN is $N=2^n+1$ (in this embodiment, n=3, thus N=9) and in a beam formation/frequency analysis operation of the signal processor 10. Other arrangements are identical, and explanation thereof in detail will be omitted here.

In the following discussion, the N−1 (=$2^n$) receiver channels chi1 to ch(N−1) other than the receiver channel chN connected to the receiving antenna ARN located at one end of an array of the receiving antennas AR1 to ARN will be referred to as A-series channels, and the N−1 receiver channels ch2 to chN other than the receiver channel ch1 connected to the receiving antenna AR1 located at the other end of the array of the receiving antennas AR1 to ARN will be referred to as B-series channels.

Figure 4:
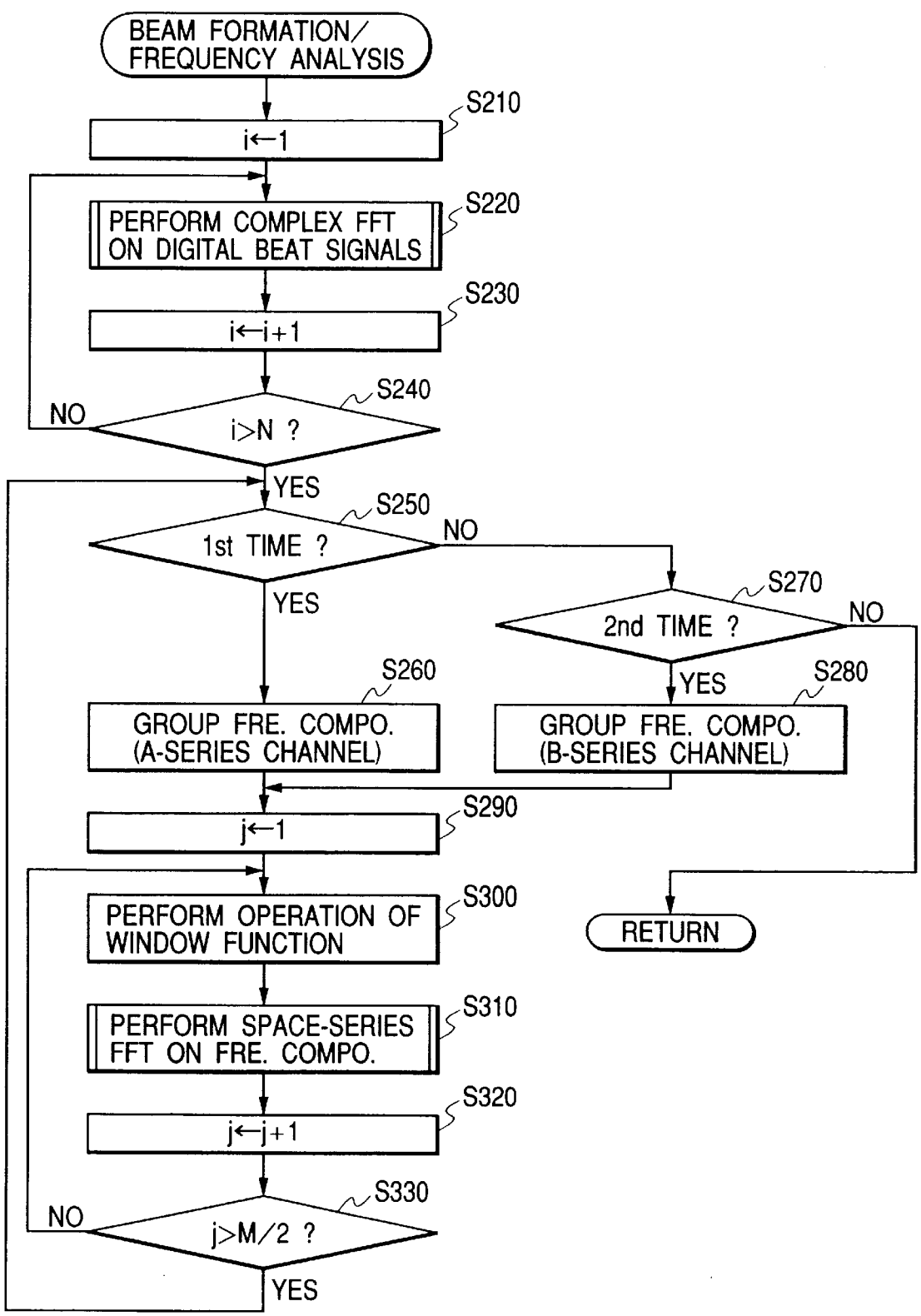
FIG. 4 is a flowchart of a beam formation/frequency analysis program according to the second embodiment of the invention.

FIG. 4 is a flowchart of a program performed by the signal processor 10 of the second embodiment to form the digital beams and to analyze the frequency of the digital beat signals Di produced in each of the receiver channels ch1 to chN.

Steps 210 to 240 are identical with steps 110 to 140 in FIG. 2. Specifically, the M-point time-series FFT operation is performed on the digital beat signals Di (D[i, 1], ..., D[i, M] in each of the receiver channels chi (i=1, 2, ..., N).

The following steps use, like the first embodiment, only M/2 data F[i, 1], ..., F[i, M/2] of results of the time-series FFT operation which are expressed by the positive frequencies.

After step 240, the routine proceeds to step 250 wherein it is determined whether the current program execution cycle is the first cycle or not. If a YES answer is obtained, then the routine proceeds to step 260 wherein the data F[i,j], ..., F[N−1, j] (j=1, 2, ..., M/2) in the A-series channels subjected to the time-series FFT are grouped according to the frequencies Fj. Alternatively, if a NO answer is obtained in step 250, then the routine proceeds to step 270 wherein it is determined whether the current program execution cycle is the second cycle or not. If a YES answer is obtained, then the routine proceeds to step 280 wherein the data F[2, j], ..., F[N1, j] in the B-series channels subjected to the time-series FFT are grouped according to the frequencies Fj.

After step 260 or 280, the routine proceeds to step 290 wherein an ID number j for identifying one of the frequencies Fj is initialized to one (1). The routine proceeds to step 300 wherein the operation of the window function is, like the first embodiment, performed on the (N−1) frequency components which are derived in either of steps 260 and 280 and which belong to the group of the first frequency F1.

The routine proceeds to step 310 wherein the (N−1)-point space-series FFT operation is performed, unlike the first embodiment, on the (N−1) frequency components without adding the dummy data thereto.

The routine proceeds to step 320 wherein the ID number j is incremented by one (1). The routine proceeds to step 330 wherein it is determined whether the ID number j is greater than the number M/2 of the frequency components to be processed in each receiver channel chi or not. If a NO answer is obtained, the routine returns back to step 250 to perform the window function operation on the frequency components which belong to the next group of the second frequency F2. Alternatively, if a YES answer is obtained, then the routine returns back to step 250.

If a NO answer is obtained in step 270 meaning that the space-series FFT operations have been completed on the data produced both in the A- and B-series channels, then the routine terminates.

Figure 5:
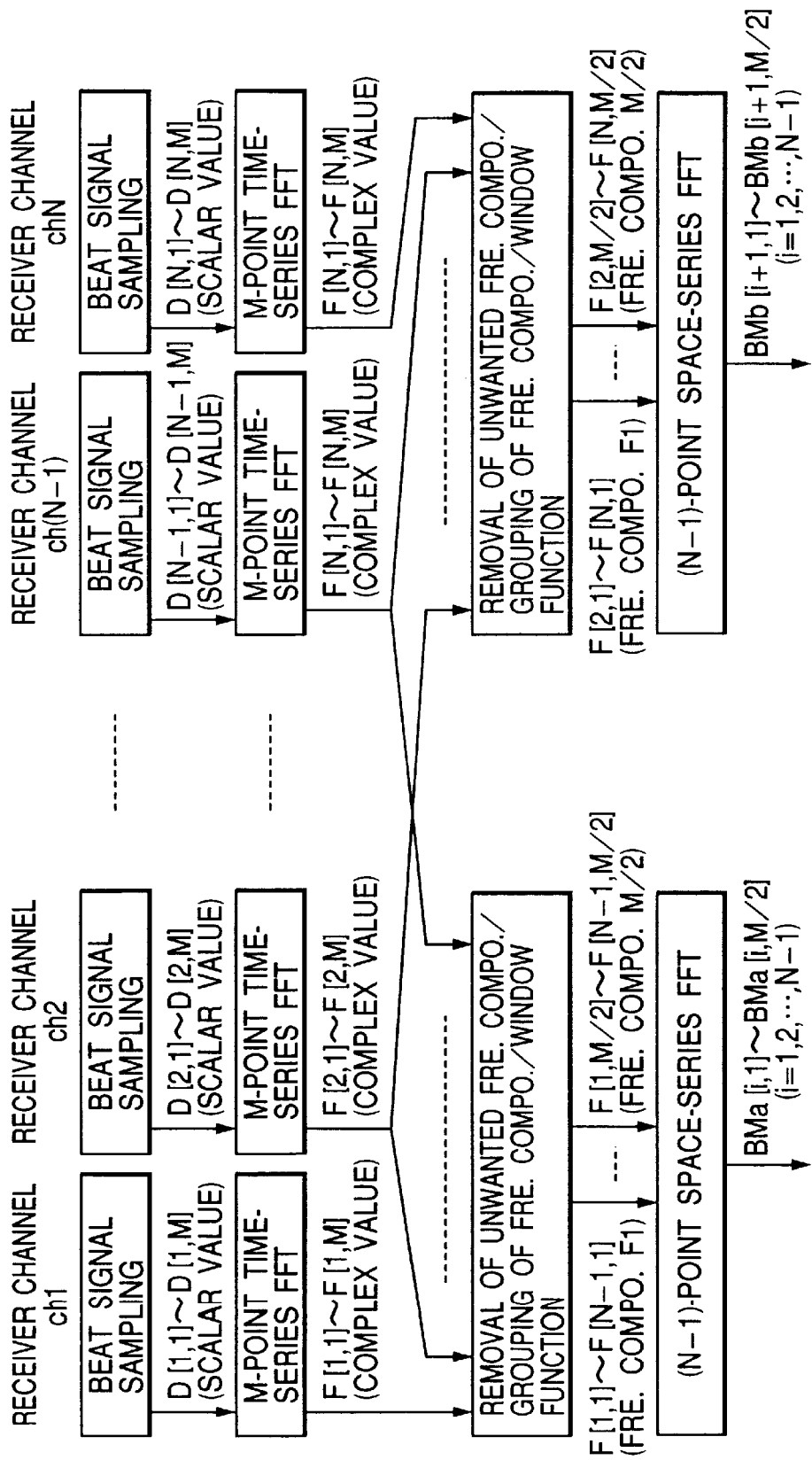
FIG. 5 is a block diagram which shows a sequence of operations performed in the flowchart of FIG. 4.
Figure 6A:
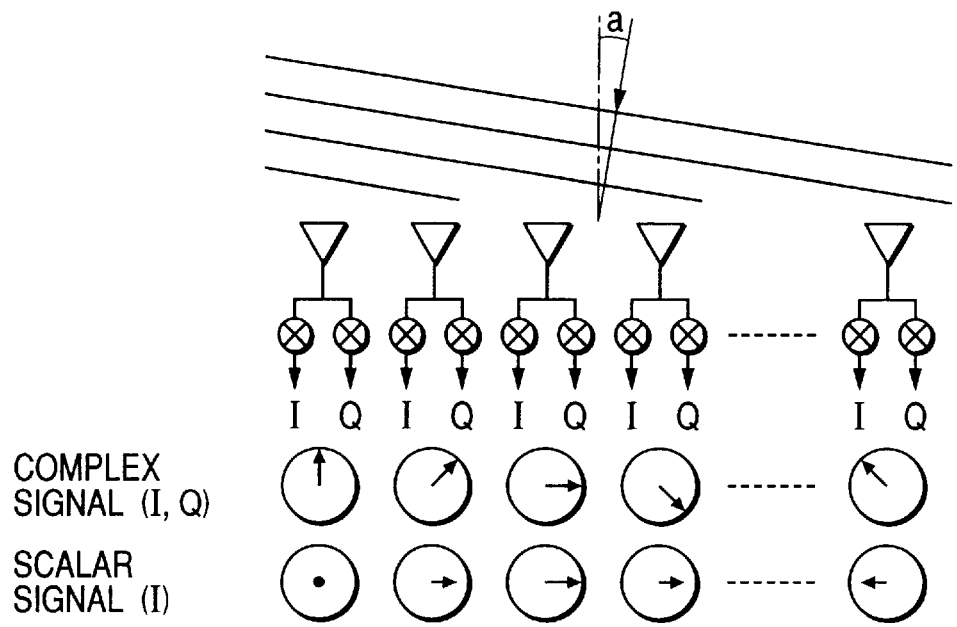
FIGS. 6(a) and 6(b) are illustrations for explaining a problem encountered in forming digital beams using baseband scalar signals as beat signals.
Figure 6B:
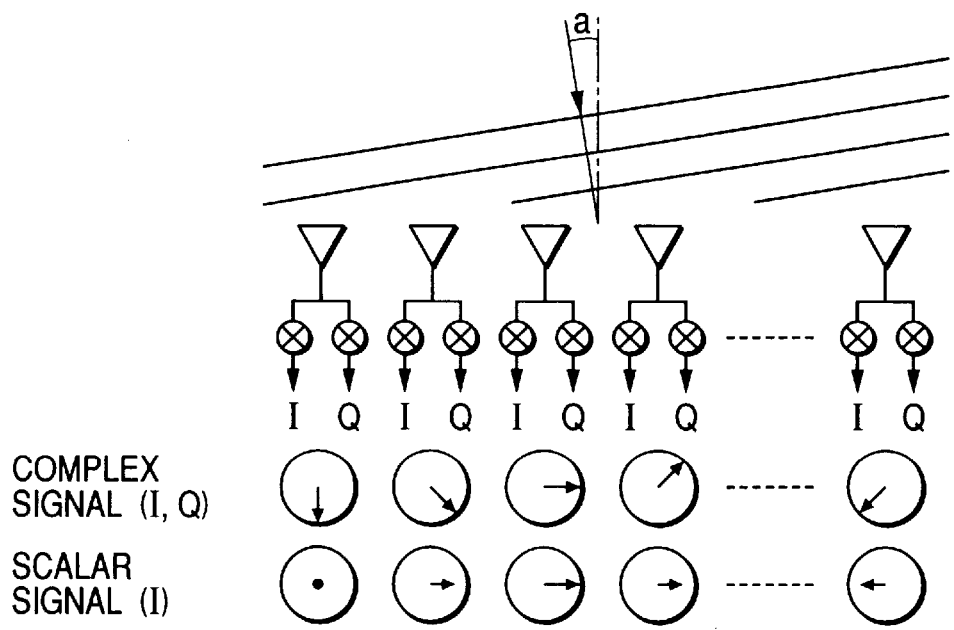
Figure 7:
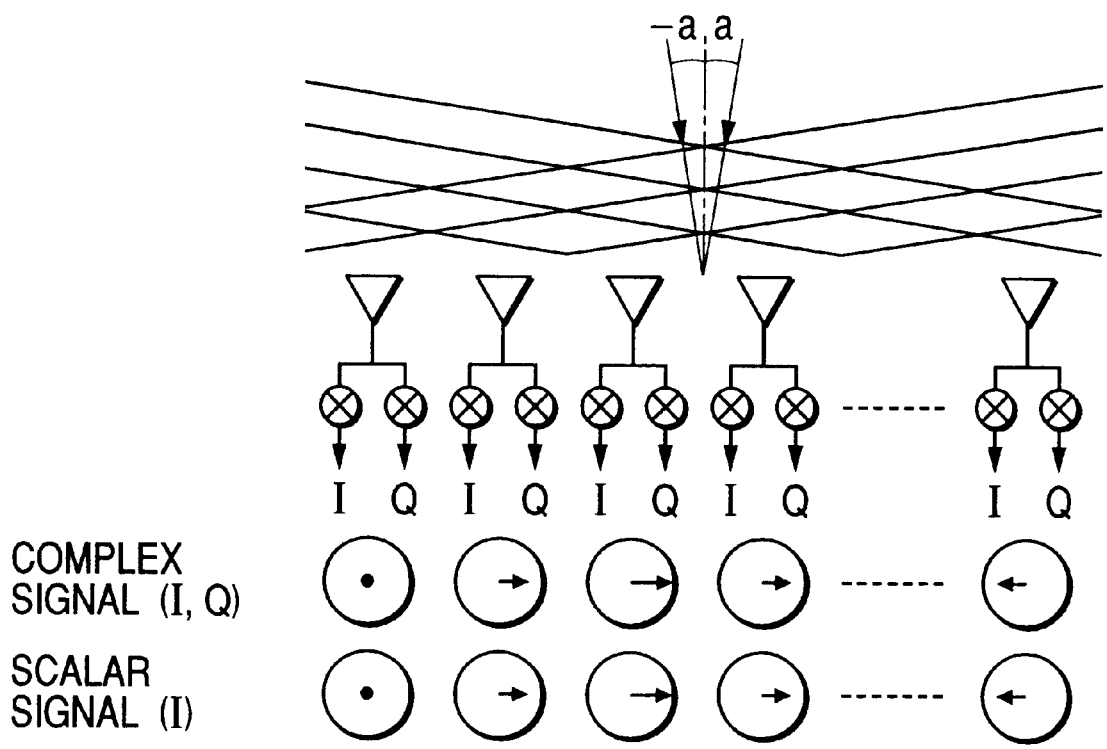
FIG. 7 is an illustration for explaining a problem encountered in forming digital beams using baseband scalar signals as beat signals.

As apparent from the above discussion, the beat signal Bi is, as shown in FIG. 5, sampled to produce the M digital beat signals Di (D[i, 1], ..., D[i, M] in each of the receiver channels ch1 to chN. The M digital beat signals Di are subjected to the M-point time-series FFT operation, processed to remove unwanted frequency components therefrom, and grouped according to the frequencies Fj either in the A-series channels or in the B-series channels. The frequency components in each group are subjected to the (N−1)-point space-series FFT. This enables results of the frequency analysis of each of (N−1) beams formed by the space-series FFT, that is, frequency data BMai (BMa[i, 1], . . . , BMa[i, M/2] and data BMbi (BMb[i+1, 1], . . . , BMb[i+1, M/2] (i=1, 2, . . . , N−1) to be derived through the A-series channels and the B-series channels, respectively.

The signal processor 10 finds results of the frequency analysis of each beam both in the frequency-modulated rising and falling ranges and uses beat frequencies produced by radar returns from the same object in the frequency-modulated rising and falling ranges to determine the distance to and relative speed of the target in a manner well known in the field of FMCW radar techniques. The signal processor 10 may also decide by which beam the target is detected to determine the azimuth or angular direction of the target. Since beams formed by the frequency data BMai and BMbi indicate the same direction, a phase monopulse system designed to compare phases of the same frequency components of the beams may be used for improving the accuracy in measuring the angular direction of the target further.

The radar apparatus 2 of the second embodiment is, like the first embodiment, designed to perform the complex FFT twice in the time-series and space-series to obtain results of frequency analysis of each beam, thereby allowing the structure of the radar apparatus 2 to be simplified greatly as compared with the conventional radar systems.

The complex FFTs are, like the first embodiment, performed in the order of the time-series and space-series, thereby decreasing the amount of operation executed in the signal processor 10 greatly as compared with when the complex FFTs are performed in the reverse order. Specifically, a conventional system designed to perform the complex FFTs in the order of the space-series and the time-series requires an operation on Eq.(3) below, while the radar apparatus 2 of this embodiment requires an operation on Eq.(4) below.

$$M \times 2(N-1) \cdot \log(N-1) + 2(N-1) \times M \cdot \log(M) \quad (3)$$

$$N \times M \cdot \log(M) + M/2 \times 2(N-1) \cdot \log(N-1) \quad (4)$$

In this embodiment, M=512, and N=9. Thus, Eq.(3)≈29593, and Eq.(4)≈14797. This means that an operation load of the radar apparatus 2 of this embodiment is half that of the conventional system. Specifically, it is possible for the radar apparatus 2 to perform operations of the time-series FFT only the same number of times as the receiver channels ch1 to chi regardless of the two A-and B-series channels used in operations of the space-series FFT and also to remove half of results of the operations of the time-series FFT when the operations of the space-series FFT are performed, thereby allowing the operation load to be reduced greatly.

The radar apparatus 2 in either of the first and second embodiments is designed as a FM-CW radar which transmits a frequency-modulated continuous wave, but may be designed as a CW radar which transmits a single frequency continuous wave, a so-called two-frequency CW radar which transmits a continuous wave whose frequency is changed in each half cycle, or a multi-frequency CW radar which transmits a three or more-frequency continuous wave. These modifications may be achieved by changing the structure of the high frequency oscillator 12 depending upon the type of the continuous wave to be transmitted and also changing the operations to determine the information about the target based on results of the frequency analysis of each beam produced by the two-time complex FFTs depending upon the type of the continuous wave to be transmitted.

The zero-padding used in the operation of the space-series FFT and the formation of beams through the A-and B-series channels may be performed simultaneously. This promotes a decrease in operation load of the signal processor 10 resulting from the execution of the complex FFTs in the order of the time-series and space-series.

Further, the complex FFT may also be performed without the operation of the space-series FFT and the zero-padding. In this case, it is, like the first and second embodiments, possible to remove an unwanted half of results of the operation of the time-series FFT, thereby resulting in a decrease in operation load of the signal processor 10.

Furthermore, the complex FFTs may be performed in the order of the space-series and the time-series. This may also be achieved, like the first and second embodiments, by providing a single series of a mixture, AD converter, etc., for each receiving antenna.

While the present invention has been disclosed in terms of the preferred embodiments in order to facilitate better understanding thereof, it should be appreciated that the invention can be embodied in various ways without departing from the principle of the invention. Therefore, the invention should be understood to include all possible embodiments and modifications to the shown embodiments which can be embodied without departing from the principle of the invention as set forth in the appended claims.

What is claimed is:

1. A radar apparatus comprising:
a transmitter providing a transmit signal having a preselected frequency to produce an output signal to be transmitted as a radar wave to a radar detectable zone;
an array of receiving antennas;
a plurality of receivers each of which mixes an input signal that is a return of the radar wave from a target object received by one of said receiving antennas with a local signal having the same frequency as that of the transmit signal to produce a single beat signal including a frequency component corresponding to a difference in frequency between the output signal and the input signal; and
a signal processing circuit forming beams, made of components of the beat signals, corresponding to angular directions predetermined in the radar detectable zone, said signal processing performing complex Fourier Transform twice on the beat signals in time series and space series along the array of said receiving antennas to derive results of frequency analysis in units of the beams.

2. A radar apparatus as set forth in claim 1, wherein said signal processing circuit adds a plurality of dummy data whose values are zero to the beat signals when the Fourier Transform is performed in the space series so as to produce frequency components greater in number than said receivers.

3. A radar apparatus as set forth in claim 2, wherein each of said receivers receives the input signal from one of said receiving antennas arrayed in line, and wherein said signal processing circuit performs the complex Fourier Transform on each of a first beat signal group made up of the beat signals produced by the input signals from the antennas other than one located at one end of the array of the antennas and a second beat signal group made up of the beat signals produced by the input signals from the antennas other than one located at the other end of the array of the antennas to form the beams in units of the first and second beat signal groups.

4. A radar apparatus as set forth in claim 1, wherein said signal processing circuit performs the complex Fourier Transform, in the time series, on the beat signal produced by each of said receivers to produce frequency components and also performs the complex Fourier Transform, in the space series, on the frequency components produced using the beat signals in all said receivers in units of frequency for forming the beams.

5. A radar apparatus as set forth in claim 1, wherein said transmitter produces the transmit signal whose frequency is increased and decreased cyclically.

6. A radar apparatus as set forth in claim 1, wherein said transmitter produces, in sequence, a plurality of transmit signals having different frequencies.

* * * * *